(No Model.)
E. O. DAY.
NURSING BOTTLE.
No. 253,014.                    Patented Jan. 31, 1882.
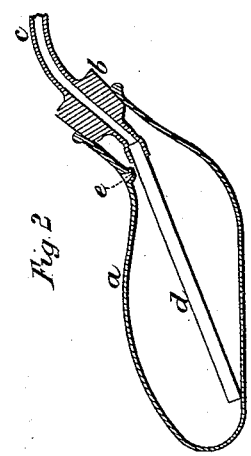
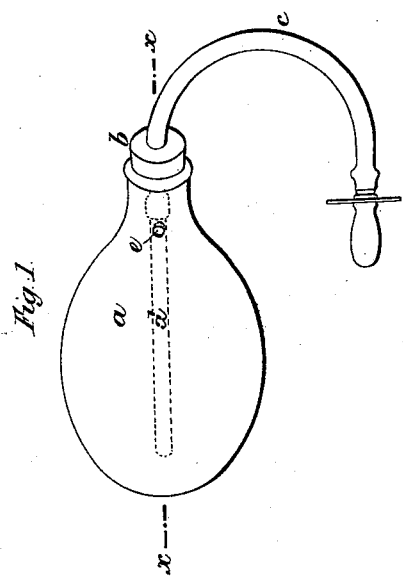
Witnesses,
J. A. Rutherford
Robert Everett.
Inventor.
Edmund Overman Day.
By James L. Norris.
Atty.

UNITED STATES PATENT OFFICE.

EDMUND O. DAY, OF LONDON, ENGLAND.

NURSING-BOTTLE.

SPECIFICATION forming part of Letters Patent No. 253,014, dated January 31, 1882.

Application filed December 7, 1881. (No model.) Patented in England October 28, 1880.

*To all whom it may concern:*

Be it known that I, EDMUND OVERMAN DAY, of London, England, surgeon, have invented a new and useful Improved Feeding-Bottle for Infants and Invalids, (for which I have obtained a patent in Great Britain, No. 4,413, bearing date October 28, 1880,) of which the following is a specification.

The ordinary feeding-bottle as constructed for infants' use is a frequent cause of illness to children and a constant source of anxiety and trouble to mothers and nurses. The trouble arises chiefly from the difficulty of keeping the bottle and its fittings sufficiently clean at all times to prevent the turning sour of the milk or other contents of the said bottle. The parts most difficult to cleanse and keep clean are the neck and stopper and the flexible tube.

By my invention I have sought to obviate the above inconveniences and to furnish a feeding-bottle which can be cleansed and kept clean with comparatively little trouble, and which will therefore afford facility for keeping the food in a sweet and wholesome condition.

My invention is illustrated in the accompanying drawings, in which Figure 1 is an exterior top view of my improved feeding-bottle provided with its stopper; and Fig. 2 is a longitudinal section on the line $x$ $x$, Fig. 1.

Like letters indicate the same parts in both figures.

$a$ is the bottle, which is formed of glass or other suitable material. $b$ is the stopper. $c$ is the flexible tube, attached to the glass tube $d$ in the usual manner.

According to my invention I form the stopper of india-rubber, or other like material which will not be corroded by the action of the milk or other food, and I so fit this stopper in the neck of the bottle as to leave no projections or spaces for the lodgment of particles of milk or other food. Moreover, I form the flexible tube $c$ in one piece with the stopper $b$, or secure the said tube immovably in the said stopper, and thus avoid the aperture through the same, which in the ordinary feeding-bottles affords a surface for the retention of sour and unwholesome food, and which is very difficult to clean.

The flexible tubes ordinarily heretofore used for such bottles have been formed of very soft or pliant india-rubber, which easily collapses or closes, and is very difficult to clean. I therefore prefer to use tubes made of comparatively hard india-rubber, which is not easily collapsed, and therefore retains its circular form in all positions in which the bottles may be used. I also prefer that the interior of the tube should be rendered very smooth and impervious to the chemical action of the milk or other food by coating or glazing it with a suitable varnish or preparation which will adhere permanently to the india-rubber.

I provide for the admission of air to the bottle as follows—that is to say: On one side of the bottle $a$, just below the neck, I form a cavity or depression, at the bottom of which there is a small hole, $e$, through the glass, by which construction and arrangement, if the bottle should be turned the wrong side upward, the tendency is to prevent the escape of the contents of the bottle.

The flexible feeding-tube $c$, formed, as hereinbefore described, in one piece with the stopper $b$, is provided at its outer end with a nipple, of rubber or suitable material, having a central space or reservoir and a series of small holes, through which the milk or other liquid may be drawn from the reservoir. By forming the stopper in one piece with the flexible feeding-tube which carries the nipple, in the manner set forth and shown, a perfect and permanent union between the stopper and tube is effected, rendering it impossible to accidentally separate them, except by breakage, avoiding the possibility of leakage, and rendering it unnecessary to depend upon the employment of extraneous attaching devices, such as a projection or stem on the stopper, over which the end of the tube is sprung.

What I claim is—

As an improved article of manufacture, the herein-described stopper for feeding-bottles, formed in a single piece with the flexible feeding-tube $c$, to the outer end of which the nipple is attached, as and for the purpose described.

In witness whereof I have hereunto signed my name in the presence of two subscribing witnesses.

ED. OVERMAN DAY.

Witnesses:
LEWIS SANDERSON,
W. CROSS.